US011520841B2

(12) United States Patent
Luo

(10) Patent No.: US 11,520,841 B2
(45) Date of Patent: Dec. 6, 2022

(54) INFORMATION RECOMMENDATION METHOD, TERMINAL DEVICE, AND SERVER

(71) Applicant: Shenzhen HeyTap Technology Corp., Ltd., Guangdong (CN)

(72) Inventor: Yue Luo, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 262 days.

(21) Appl. No.: 16/803,825

(22) Filed: Feb. 27, 2020

(65) Prior Publication Data

US 2020/0201923 A1 Jun. 25, 2020

Related U.S. Application Data

(63) Continuation of application No. PCT/CN2017/100086, filed on Aug. 31, 2017.

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/9536* (2019.01); *G06F 16/9538* (2019.01)

(58) Field of Classification Search
CPC ............. G06F 16/9535; G06F 16/9536; G06F 16/9538
See application file for complete search history.

(56) References Cited

U.S. PATENT DOCUMENTS

2011/0184899 A1* 7/2011 Gadanho .......... H04N 21/26283
706/46
2011/0276512 A1 11/2011 Asikainen
(Continued)

FOREIGN PATENT DOCUMENTS

CN 103051960 A 4/2013
CN 104239519 A 12/2014
(Continued)

OTHER PUBLICATIONS

Ndian Examination Report for IN Application 202017012776 dated Jun. 21, 2021. (6 pages).
(Continued)

*Primary Examiner* — Hung Q Pham
(74) *Attorney, Agent, or Firm* — Young Basile Hanlon & MacFarlane, P.C.

(57) ABSTRACT

An information recommendation method and a related device. The method includes: receiving first recommended information recommended by a server in a first time period, the first recommended information being information associated with a first type of information associated with viewed information of a user with a viewed amount not less than a first threshold and determined according to a first behavior record of the user; receiving second recommended information recommended by the server in a second time period; and receiving third recommended information recommended by the server in a third time period, the third recommended information being information associated with a second type of information associated with second viewed information of the user with a second viewed amount not less than a second threshold and determined according to a second behavior record of the user.

10 Claims, 5 Drawing Sheets

(51) Int. Cl.
*G06F 16/9536* (2019.01)
*G06F 16/9538* (2019.01)

(56) References Cited

U.S. PATENT DOCUMENTS

| | | | | |
|---|---|---|---|---|
| 2012/0078747 | A1* | 3/2012 | Chakrabarti | G06Q 30/0601 |
| | | | | 705/26.7 |
| 2014/0122502 | A1* | 5/2014 | Kalmes | G06F 16/284 |
| | | | | 707/748 |
| 2015/0052003 | A1 | 2/2015 | Tang et al. | |

FOREIGN PATENT DOCUMENTS

| CN | 105578292 | A | 5/2016 |
|---|---|---|---|
| CN | 105956161 | A | 9/2016 |
| CN | 106098056 | A | 11/2016 |
| CN | 106874374 | A | 6/2017 |
| CN | 106993048 | A | 7/2017 |
| CN | 107040593 | A | 8/2017 |
| CN | 107105030 | A | 8/2017 |
| JP | 2004234128 | A | 8/2004 |

OTHER PUBLICATIONS

Chinese Office Action with English Translation for CN Application 201780092170.9 dated Dec. 3, 2021. (12 pages).
Communication pursuant to Article 94(3) EPC for EP Application 17923877.9 dated Oct. 20, 2021. (7 pages).
Yajie Hu et al, Nextone Player: A Music Recommendation System Based On User Behavior,12th International Society for Music Information Retrieval Conference, Miami, US, 2011.
European search report, EP 17923877, dated May 19, 2020 (9 pages).
English Translation of the Written Opinion of the International Searching Authority,Appication PCT/CN2017/100086 dated May 30, 2020.
International search report,PCT/CN2017/100086, dated May 30, 2018 (3 pages).

* cited by examiner

INFORMATION RECOMMENDATION METHOD, TERMINAL DEVICE, AND SERVER

CROSS-REFERENCE TO RELATED APPLICATION(S)

This application is a continuation application of International (PCT) Patent Application No. PCT/CN2017/100086, filed on Aug. 31, 2017, the contents of which are herein incorporated by reference in their entireties.

TECHNICAL FIELD

The present disclosure relates to the field of electronic devices, and in particular, to an information recommendation method, and a terminal device, and a server.

BACKGROUND

At present, terminal devices (such as smart phones) have become indispensable tools for people's daily lives. Various applications (APPs) with various functions have been developed, which brings great convenience to people. In order to bring people a better experience, most of the APPs will recommend information to people. For examples, news APPs recommend news, application store APPs recommend applications resources to users, and the like. At present, APPs usually recommend favorite information to the users.

SUMMARY

In some aspects, an information recommendation method is provided in some embodiments of the present disclosure. The method may include the following operations: receiving, by a terminal device, first recommendation information recommended by a server in a first time period, the first recommendation information being information associated with a first type, and the first type being a type of information associated with first viewed information of a user with a first viewed amount not less than a first threshold and determined according to a first behavior record of the user; receiving, by the terminal device, second recommendation information recommended by the server in a second time period, wherein the second recommendation information comprises random-recommendation information randomly recommended by the server or target recommendation information recommended by the server; and receiving, by the terminal device, third recommendation information recommended by the server in a third time period, the third recommendation information being information associated with a second type, and the second type being a type of information associated with second viewed information of the user with a second viewed amount not less than a second threshold and determined according to a second behavior record of the user; the second behavior record being a record of a behavior of the user in the second time period.

In some aspects, an information recommendation method is provided in some embodiments of the present disclosure. The method may include the following operations: recommending, by a server, first recommendation information to a terminal device in a first time period, the first recommendation information being information associated with a first type, and the first type being a type of information associated with first viewed information of a user with a first viewed amount not less than a first threshold and determined according to a first behavior record of the user; recommending, by the server, second recommendation information to the terminal device in a second time period and recording a second behavior record of the user in the second time period, wherein the second recommendation information comprises random-recommendation information randomly recommended by the server or target recommendation information recommended by the server; and recommending, by the server, third recommendation information to the terminal device in a third time period, the third recommendation information being information associated with a second type, and the second type being a type of information associated with second viewed information of the user with a second viewed amount not less than a second threshold and determined according to the second behavior record.

In some aspects, a terminal device is provided in some embodiments of the present disclosure. The terminal device may include at least one processor, at least one non-transitory memory, and at least one program. The at least one program is stored in the at least one non-transitory memory and configured to be executed by the at least one processor, and the at least one program comprises instructions for performing the method as described aforesaid.

In some aspect, a server is provided in some embodiments of the present disclosure. The server may include at least one processor, at least one non-transitory memory, at least one transceiver, and at least one program. The at least one program is stored in the at least one non-transitory memory and configured to be executed by the at least one processor, and the at least one program comprises instructions for performing the method as described aforesaid.

These or other aspects of the present disclosure will be more concise and easy to understand in the description of the following embodiments.

BRIEF DESCRIPTION OF DRAWINGS

In order to make the technical solution described in embodiments or background of the present disclosure more clearly, the drawings used for the description of the embodiments or background will be described. Apparently, the drawings in the following description are only some embodiments of the present disclosure. For those skilled in the art, other drawings may be acquired according to the drawings without any creative work.

DETAILED DESCRIPTION

Figure 1:
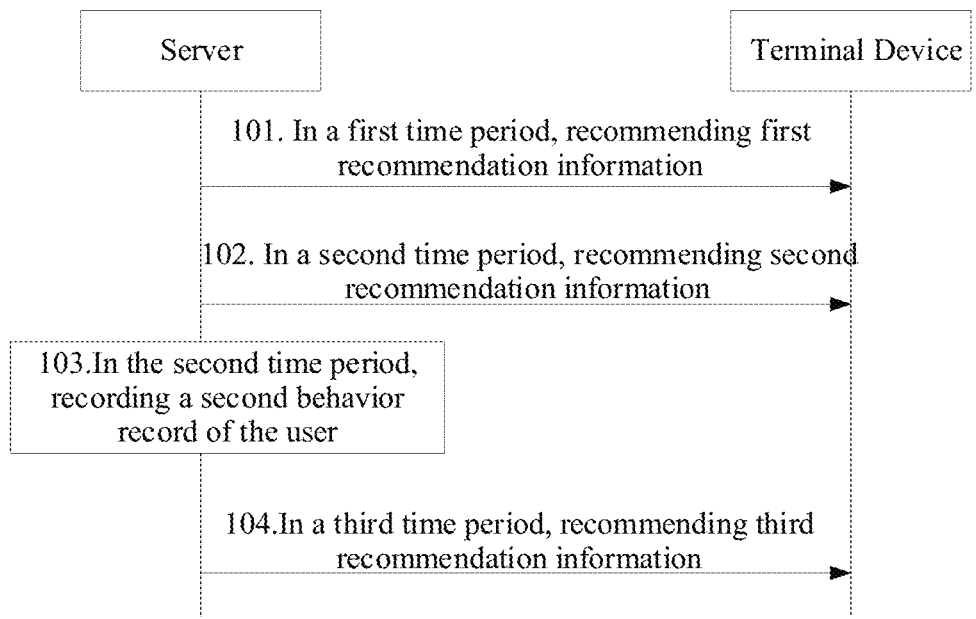
FIG. 1 is a schematic flow chart of an information recommendation method according to some embodiments of the present disclosure.

In order to better understand the present disclosure for those skilled in the art, the technical solutions in the embodiments of the present disclosure are clearly and completely described in conjunction with the drawings in the embodiments of the present disclosure. It is obvious that the described embodiments are only a part of the embodiments of the present disclosure, and not all embodiments. All other embodiments acquired by the ordinary skilled in the art based on the embodiments in the present disclosure without the creative work are all within the scope of the present disclosure.

Some embodiments of the present disclosure will be described in detail below.

The terms "first", "second", "third", "fourth", and the like used in the specification and claims of the present disclosure and the above drawings are used to distinguish different objects, and are not intended to describe a specific order. Furthermore, the terms "including" and "having", and any modification thereof are intended to cover un-exclusive inclusion. For example, a process, method, system, product, or device that may include a series of steps or units is not limited to the listed steps or units, but optionally also may include steps or units not listed, or optionally may include other steps or units inherent to these processes, methods, products, or equipment.

"Embodiment" herein means that a particular feature, structure, or characteristic described with reference to embodiments may be included in at least one embodiment of the present disclosure. The term appearing in various places in the specification are not necessarily as shown in the same embodiment, and are not exclusive or alternative embodiments that are mutually exclusive with other embodiments. Those skilled in the art will understand explicitly and implicitly that the embodiments described herein may be combined with other embodiments.

In some aspects, an information recommendation method may be provided. The method may include: receiving, by a terminal device, first recommendation information recommended by a server in a first time period, the first recommendation information being information associated with a first type, and the first type being a type of information associated with first viewed information of a user with a first viewed amount not less than a first threshold and determined according to a first behavior record of the user; receiving, by the terminal device, second recommendation information recommended by the server in a second time period, wherein the second recommendation information includes random-recommendation information randomly recommended by the server or target recommendation information recommended by the server; and receiving, by the terminal device, third recommendation information recommended by the server in a third time period, the third recommendation information being information associated with a second type, and the second type being a type of information associated with second viewed information of the user with a second viewed amount not less than a second threshold and determined according to a second behavior record of the user; the second behavior record being a record of a behavior of the user in the second time period.

In some embodiments, a duration of the first time period is greater than a duration of the second time period, and a duration of the third time period is greater than the duration of the second time period; the second time period follows the first time period, and the third time period follows the second time period.

In some embodiments, receiving, by the terminal device, second recommendation information recommended by the server in a second time period, includes: receiving, by the terminal device, the random-recommendation information randomly recommended by the server in the second time period.

In some embodiments, the first time period is adjacent to the second time period. Before receiving, by the terminal device, second recommendation information recommended by the server in a second time period, the method further includes: displaying, by the terminal device, a random-recommendation button on a display interface at a target time point; wherein the target time point is located within the first time period, and a time interval between the target time point and an ending time point of the first time period is less than a third threshold; and in response to detecting a clicking operation on the random-recommendation button, sending, by the terminal device, a random-recommendation request to the server in a target duration; wherein the random-recommendation request is configured to instruct the server to randomly recommend information to the terminal device in the second time period.

In some embodiments, receiving, by the terminal device, second recommendation information recommended by the server in a second time period, includes: in response to detecting no clicking operation on the random-recommendation button in the target duration, receiving, by the terminal device, fourth recommendation information recommended by the server in the second time period; wherein the fourth recommendation information is information associated with a third type, and the third type is a type of information associated with third viewed information of the user with a third viewed amount not less than a third threshold and determined according to a third behavior record of the user, the third behavior record is a record of the behavior of the user in the first time period, and the fourth recommendation information is utilized as the target recommendation information of the second recommendation information; and in response to the server receiving the random-recommendation request, receiving, by the terminal device, the random-recommendation information randomly recommended by the server in the second time period.

In some embodiments, in response to detecting no clicking operation on the random-recommendation button in the target duration, hiding, by the terminal device, the random-recommendation button.

In some aspects, an information recommendation method may be provided. The method may include: recommending, by a server, first recommendation information to a terminal device in a first time period, the first recommendation information being information associated with a first type, and the first type being a type of information associated with first viewed information of a user with a first viewed amount not less than a first threshold and determined according to a first behavior record of the user; recommending, by the server, second recommendation information to the terminal device in a second time period and recording a second behavior record of the user in the second time period, wherein the second recommendation information includes random-recommendation information randomly recommended by the server or target recommendation information recommended by the server; and recommending, by the server, third recommendation information to the terminal device in a third time period, the third recommendation information being information associated with a second type, and the second type being a type of information associated with second viewed information of the user with a second viewed amount not less than a second threshold and determined according to the second behavior record.

In some embodiments, a duration of the first time period is greater than a duration of the second time period, and a duration of the third time period is greater than the duration of the second time period; the second time period follows the first time period, and the third time period follows the second time period.

In some embodiments, recommending, by the server, second recommendation information to the terminal device in a second time period, includes: randomly recommending, by the server, the random-recommendation information to the terminal device in the second time period.

In some embodiments, before recommending, by the server, second recommendation information to the terminal device in a second time period, the method further includes: receiving, by the server, a random-recommendation request transmitted by the terminal device, wherein the random-recommendation request is configured to instruct the server to randomly recommend information to the terminal device in the second time period, and the random-recommendation request is triggered in response to the terminal device detecting a clicking operation on a random-recommendation button.

In some embodiments, recommending, by the server, second recommendation information to the terminal device in a second time period, includes: in response to the server receiving no random-recommendation request transmitted by the terminal device, recommending, by the server, fourth recommendation information to the terminal device in the second time period; wherein the fourth recommendation information is information associated with a third type, and the third type is a type of information associated with third viewed information of the user with a third viewed amount not less than a third threshold and determined according to a third behavior record of the user; the third behavior record is a record of the behavior of the user in the first time period, and the fourth recommendation information is utilized as the target recommendation information of the second recommendation information; and in response to the server receiving the random-recommendation request, randomly recommending, by the server, the random-recommendation information to the terminal device in the second time period.

In some aspects, a terminal device is provided. The terminal device may include at least one processor, at least one non-transitory memory, and at least one program. The at least one program is stored in the at least one non-transitory memory and configured to be executed by the at least one processor to perform an information recommendation method, and the method includes: receiving, by a terminal device, first recommendation information recommended by a server in a first time period, the first recommendation information being information associated with a first type, and the first type being a type of information associated with first viewed information of a user with a first viewed amount not less than a first threshold and determined according to a first behavior record of the user; receiving, by the terminal device, second recommendation information recommended by the server in a second time period, wherein the second recommendation information includes random-recommendation information randomly recommended by the server or target recommendation information recommended by the server; and receiving, by the terminal device, third recommendation information recommended by the server in a third time period, the third recommendation information being information associated with a second type, and the second type being a type of information associated with second viewed information of the user with a second viewed amount not less than a second threshold and determined according to a second behavior record of the user; the second behavior record being a record of a behavior of the user in the second time period.

In some embodiments, a duration of the first time period is greater than a duration of the second time period, and a duration of the third time period is greater than the duration of the second time period; the second time period follows the first time period, and the third time period follows the second time period.

In some embodiments, receiving, by the terminal device, second recommendation information recommended by the server in a second time period, includes: receiving, by the terminal device, the random-recommendation information randomly recommended by the server in the second time period.

In some embodiments, the first time period is adjacent to the second time period. Before receiving, by the terminal device, second recommendation information recommended by the server in a second time period, the method further includes: displaying, by the terminal device, a random-recommendation button on a display interface at a target time point; wherein the target time point is located within the first time period, and a time interval between the target time point and an ending time point of the first time period is less than a third threshold; and in response to detecting a clicking operation on the random-recommendation button, sending, by the terminal device, a random-recommendation request to the server in a target duration; wherein the random-recommendation request is configured to instruct the server to randomly recommend information to the terminal device in the second time period.

In some embodiments, receiving, by the terminal device, second recommendation information recommended by the server in a second time period, includes: in response to detecting no clicking operation on the random-recommendation button in the target duration, receiving, by the terminal device, fourth recommendation information recommended by the server in the second time period; wherein the fourth recommendation information is information associated with a third type, and the third type is a type of information associated with third viewed information of the user with a third viewed amount not less than a third threshold and determined according to a third behavior record of the user, the third behavior record is a record of the behavior of the user in the first time period, and the fourth recommendation information is utilized as the target recommendation information of the second recommendation information; and in response to the server receiving the random-recommendation request, receiving, by the terminal device, the random-recommendation information randomly recommended by the server in the second time period.

In some aspects, a server is provided. The server may include at least one processor, at least one non-transitory memory, and at least one program. The at least one program is stored in the at least one non-transitory memory and configured to be executed by the at least one processor to perform an information recommendation method. The method may include: recommending, by a server, first recommendation information to a terminal device in a first time period, the first recommendation information being information associated with a first type, and the first type being a type of information associated with first viewed information of a user with a first viewed amount not less than a first threshold and determined according to a first behavior record of the user; recommending, by the server, second recommendation information to the terminal device in a second time period and recording a second behavior record of the user in the second time period, wherein the second recommendation information includes random-recommendation information randomly recommended by the server or target recommendation information recommended by the server; and recommending, by the server, third recommendation information to the terminal device in a third time period, the third recommendation information being information associated with a second type, and the second type being a type of information associated with second viewed information of the user with a second viewed amount not less than a second threshold and determined according to the second behavior record.

In some embodiments, recommending, by the server, second recommendation information to the terminal device in a second time period, includes: randomly recommending, by the server, the random-recommendation information to the terminal device in the second time period.

In some embodiments, before recommending, by the server, second recommendation information to the terminal device in a second time period, the method further includes: receiving, by the server, a random-recommendation request transmitted by the terminal device, wherein the random-recommendation request is configured to instruct the server to randomly recommend information to the terminal device in the second time period, and the random-recommendation request is triggered in response to the terminal device detecting a clicking operation on a random-recommendation button.

In some embodiments, recommending, by the server, second recommendation information to the terminal device in a second time period, includes: in response to the server receiving no random-recommendation request transmitted by the terminal device, recommending, by the server, fourth recommendation information to the terminal device in the second time period; wherein the fourth recommendation information is information associated with a third type, and the third type is a type of information associated with third viewed information of the user with a third viewed amount not less than a third threshold and determined according to a third behavior record of the user; the third behavior record is a record of the behavior of the user in the first time period, and the fourth recommendation information is utilized as the target recommendation information of the second recommendation information; and in response to the server receiving the random-recommendation request, randomly recommending, by the server, the random-recommendation information to the terminal device in the second time period.

In the following, some terms used in some embodiments of the present disclosure will be explained to facilitate understanding by those skilled in the art.

1. A terminal device may refer to a device providing voice and/or data connectivity to a user, such as a handheld device or an in-vehicle device having wireless connection capability, and the like. Common terminal devices may include, for example: a mobile phone, a tablet computer, a laptop, PDAs, a mobile internet device (MID), a wearable device (such as a smart watch, a smart wristband, a pedometer, and the like), and the like.

2. A server may refer to a device providing computing services. In case that the application resource recommendation method according to some embodiments of the present disclosure is applied to an application store, then the server is a server for an application store application.

3. Being viewed by a user means being searched and/or browsed by a user. In the following, "a certain type (such as a first type, a second type, or a third type) is a type of information associated with viewed information of a user with a viewed amount not less than a certain threshold and determined according to a behavior record of the user" means that, the type is a type of information associated with searched and/or browsed information of the user with a searched and/or browsed amount not less than a certain threshold and determined according to the behavior record of the user. In some embodiments, the viewed information may include a signal piece of information having the specific type and viewed by the user for multiples times. In some embodiments, the viewed information may include multiple pieces of information having the specific type, and each of the information may be viewed for one or more times. The viewed amount of the viewed information may be the total number of times for viewing all the information having the specific type.

FIG. 1 is a schematic flow chart of an information recommendation method according to some embodiments of the present disclosure. As shown in FIG. 1, the method may include operations executed by the following blocks.

At block 101, in a first time period, a server may recommend first recommendation information to a terminal device. The first recommendation information may be information associated with a first type, and the first type may be a type of information associated with first viewed information of a user with a first viewed amount not less than a first threshold and determined according to a first behavior record of the user. The terminal device may receive the first recommendation information recommended by the server in the first time period.

At block 102, in a second time period, the server may recommend second recommendation information to the terminal device, and the terminal device may receive the second recommendation information randomly recommended by the server. In some embodiments, the second recommendation information may include random-recommendation information randomly recommended by the server or target recommendation information recommended by the server.

At block 103, in the second time period, the server may record a second behavior record of the user.

At block 104, in a third time period, the server may recommend third recommendation information to the terminal device. The third recommendation information may be the information associated with a second type, and the second type may be a type of information associated with second viewed information of the user with a second viewed amount not less than a second threshold and determined according to the second behavior record of the user. The terminal device may receive the third recommendation information recommended by the server in the third time period.

The behavior record may include at least one of the following: a search record, a browsing record, a payment record, a purchase record, and the like.

The recommendation information may include at least one of the following: an application resource, news information, product information, video information, audio information, and the like.

The first threshold may be 10, 12, 14, 15, 17, 20, or may be other values.

The second threshold may be less than the first threshold. The second threshold may be, for example, 3, 4, 5, 7, 10, 12, 14, 15, or other values.

According to some embodiments, a duration of the first time period may be greater than a duration of the second time period, and a duration of the third time period may be greater than the duration of the second time period. The second time period may follow or be subsequent to the first time period, and the third time period may follow or be subsequent to the second time period.

In case that the above information recommendation method is applied to an APP, then a starting time point of the first time period may be a time point at which the APP starts to run on the mobile terminal. The APP may be an application store APP, a shopping APP, a news APP, a game APP, and the like.

The first behavior record may be a record of the behavior of the user before the first time period. For example, in case that the starting time point of the first time period may be the time point at which the APP starts to run on the mobile terminal, then the first behavior record may be the record of the behavior of the user during the running of the APP of the last time.

In some embodiments, the duration of the first time period may be substantially equal to the duration of the third time period. For example, the duration of the first time period may be substantially equal to 10 minutes, and the duration of the third time period may be also substantially equal to 10 minutes. However, in some embodiments, the duration of the first time period may be not equal to the duration of the third time period. For example, in some embodiments, the duration of the first time period may be equal to 10 minutes, and the duration of the third time period may be equal to 12 minutes.

The first time period may be adjacent to the second time period, and the second time period may be adjacent to the third time period. That is to say, the second time period is next to the first time period, and the third time period is next to the second time period. For example, the first time period may be 10:30~10:40, the second time period may be 10:41~10:45, and the third time period may be 10:46~10:56. Or, in some embodiments, the first time period may be not adjacent to the second time period, and the second time period may be not adjacent to the third time period. For example, the first time period may be 10:30~10:40, the second time period may be 10:45~10:50, and the third time period may be 10:56~11:06.

In some embodiments, the number of times that the server recommends recommendation information to the terminal device in the first time period may have a first value, the number of times that the server recommends the recommendation information to the terminal device in the second time period may have a second value, and the number of times that the server recommends recommendation information to the terminal device in the third time period may have a third value. The first value, the second value, and the third value may be the same as each other or different from each other.

In some embodiments, the block 102 may include the following operations: receiving, by the terminal device, the random-recommendation information randomly recommended by the server in the second time period.

According to some embodiments, the above information recommendation method may be applied to an xxx application store, and the behavior record may be the search record. The duration of the first time period may be 10 minutes, the duration of the second time period may be 5 minutes, and the duration of the third time period may be 10 minutes. The starting time point of the first time period may be the time point at which the xxx application store is opened or starts to run. The first time period may be adjacent to the second time period, and the second time period may be adjacent to the third time period. After the xxx application store starts to run on the terminal device, the server may acquire the search record during the previously running of the xxx application store on the terminal device. In the search record during the previously running of xxx application store, instant messaging applications may be searched for 15 times, and news applications may be searched for 10 times. In case that the first threshold is equal to 12, then the first type may be instant messaging, and the server may recommend the application resources associated with the instant messaging to the terminal device in 10 minutes after starting to run the xxx application store. The server may randomly recommend the application resources to the terminal device in 5 minutes after the aforesaid 10 minutes from the starting time point, and record the search record of the user in the aforesaid 5 minutes. In case that in the search records of the user in the aforesaid 5 minutes, the shopping apps have been searched for 3 times, and the game apps have been searched for once, if the second threshold is equal to 3, then the second type is shopping, and the server may recommend the application resources associated with the shopping to the terminal device in 10 minutes after the xxx application store has been run for 15 minutes, that is, after 15 minutes from the starting time point.

In some embodiments, the above information recommendation method may be applied to a news APP, and the behavior record may be the browsing record. The duration of the first time period may be 10 minutes, the duration of the second time period may be 5 minutes, and the duration of the third time period may be 10 minutes. The starting time point of the first time period may be the time point at which the news app starts to run. The first time period may be adjacent to the second time period, and the second time period may be adjacent to the third time period. After the news APP starts to run on the terminal device, the server may acquire the browsing record during the previously running of the news APP on the terminal device. In the browsing record during the previously running of the news APP, the entertainment news 1 have been browsed for 15 times, and the entertainment news 2 have been browsed for 10 times. In case that the first threshold is equal to 12, then the first type may be the entertainment news 1, and the server may recommend the news associated with the entertainment news 1 to the terminal device in 10 minutes after starting to run the news app. The server may randomly recommend news to the terminal device in 5 minutes after the aforesaid 10 minutes from the starting time point, and record the browsing record of the user in the aforesaid 5 minutes. In case that in the browsing records of the user in the aforesaid 5 minutes, science and technology news have been browsed for 10 times, while entertainment news have been browsed for 2 times, if the second threshold value is equal to 7, then the second type is the science and technology news, and the server may recommend the news associated with the science and technology news to the terminal device in 10 minutes after the news APP have been run for 15 minutes, that is, after 15 minutes from the starting time point.

It can be seen that, compared to the related art in which only the favorite information is recommended to the user, in some embodiments of the present disclosure, after recommending the favorite information to the user for a certain time period, random-recommendation information may be randomly recommended to the user and the behavior record of the user may be re-recorded. The favorite information of the user may be further recommended to the user according to the re-recorded behavior records. In this way, it is possible to alleviate the problem of viewing fatigue caused by recommending the same favorite information to the user for a long time.

According to some embodiments, the first time period may be adjacent to the second time period. Before the block 102 at which the server may recommend second recommendation information to the terminal device in the second time period, the method may further include the following operations.

At a target time point, the terminal device may display a random-recommendation button on a display interface. Herein, the target time point may be located within the first time period, and a time interval between the target time point and an ending time point of the first time period may be less than a third threshold. In a target duration for displaying the random-recommendation button, in response to detecting a clicking operation on the random-recommendation button, the terminal device may send a random-recommendation request to the server. The random-recommendation request may be configured to instruct the server to randomly recommend information to the terminal device in the second time period. In response to the server receiving the random-recommendation request from the terminal device, the server may randomly recommend the random-recommendation information in the second time period.

According to some embodiments, the method may further include the following operations.

In response to detecting no clicking operation on the random-recommendation button in the target duration, the terminal device may hide the random-recommendation button.

In some embodiments, the third threshold may be, for example, 3 s, 5 s, 6 s, 7 s, 10 s, 15 s, or other values.

In some embodiments, the target duration may be substantially equal to the third threshold. For example, if the third threshold is 5 s, then the target duration may also be equal to 5 s. It can be seen that controlling the random-recommendation button to be displayed for a reasonable duration may not only remind the user, but also reduce the possibility of affecting the user's viewing experience due to the display of the random-recommendation button.

In some embodiments, the random-recommendation button may have a shape of a circle, an oval, a rhombus, a square, or may in other shapes.

In some embodiments, the random-recommendation button may be disposed at an upper-right corner of the display interface, a lower-right corner of the display interface, an upper-left corner of the display interface, a lower-left corner of the display interface, or other positions.

According to some embodiments, the method further may further include the following operations.

In response to the server receiving no random-recommendation request transmitted by the terminal device, the server may recommend fourth recommendation information to the terminal device. In some embodiments, the fourth recommendation information may be information associated with a third type. The third type may be a type of information associated with third viewed information of the user with a third viewed amount not less than a third threshold and determined according to a third behavior record of the user. The third behavior record may be a record of the behavior of the user in the first time period. The fourth recommendation information may be utilized as the target recommendation information of the second recommendation information. In response to detecting no clicking operation for the random-recommendation button in the target duration, the terminal device may receive the fourth recommendation information recommended by the server.

Figure 2:
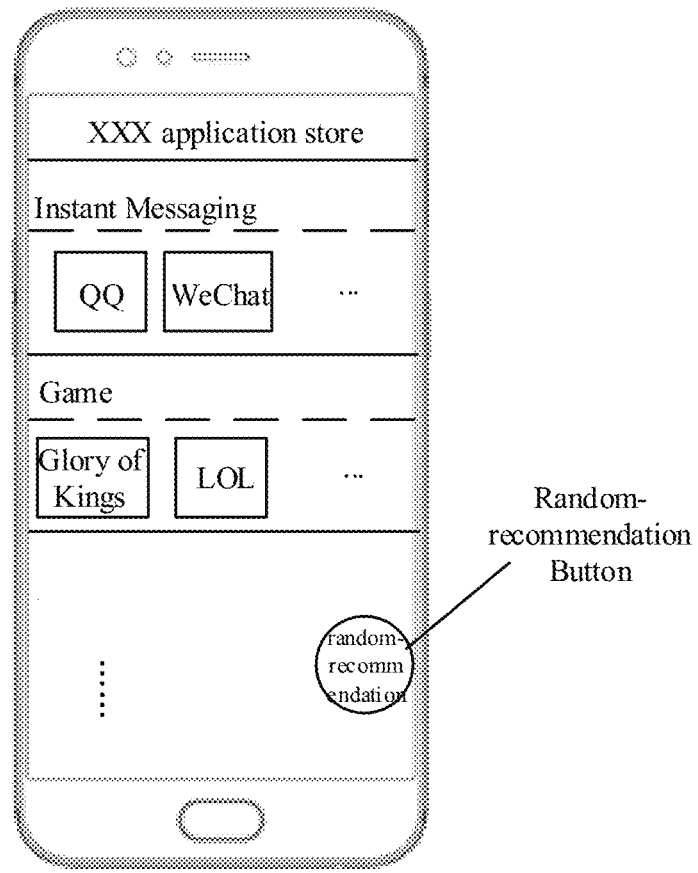
FIG. 2 is a schematic view of an interface according to some embodiments of the present disclosure.

According to some embodiments, the above information recommendation method may be applied to an xxx application store, and the behavior record may be the search record. The duration of the first time period may be 10 minutes, and the duration of the second time period may be 5 minutes. The starting time point of the first time period may be the time at which the xxx application store is opened or starts to run. The first time period may be adjacent to the second time period, and the third threshold may be equal to 5 s. In case that the xxx application store starts to run on the mobile terminal at 12:00, then the terminal device may display the random-recommendation button on the display interface at 12:09:55, as shown in FIG. 2. If the user's finger clicks the random-recommendation button within 12:09:55~12:10:00, the terminal device may send the random-recommendation request to the server to inform the server to randomly recommend the random-recommendation information to the terminal device in the second time period. If the user does not click the random-recommendation button within 12:09:55~12:10:00, then the server will not receive the random-recommendation request from the terminal device. In this case, the server may acquire the search record of the user in the first time period. In some embodiments, in the search record during the first time period, the instant messaging applications have been searched for 15 times, and the news applications have been searched for 10 times. If the fourth threshold is equal to 12, then the third type is the instant messaging, and the server may recommend the application resources associated with the instant messaging to the terminal device within 12:10:00~12:15:00.

Figure 3:
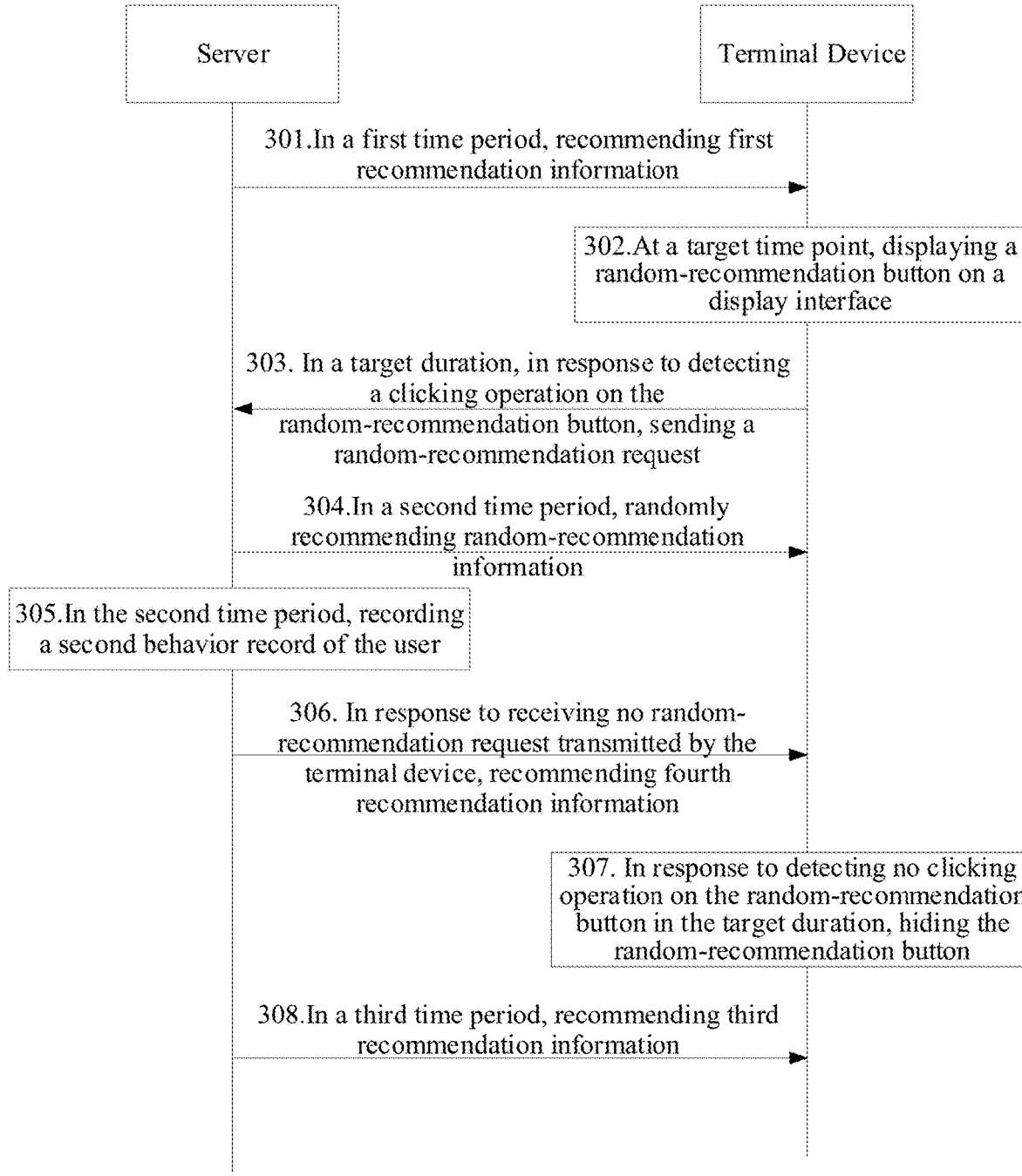
FIG. 3 is a schematic flow chart of an information recommendation method according to some embodiments of the present disclosure.

In some embodiments of the present disclosure, a more detailed flowchart of the method may be further provided. As shown in FIG. 3 the method may include the operations executed by the following blocks.

At block 301, in a first time period, a server may recommend first recommendation information to a terminal device. The first recommendation information may be the information associated with a first type. The first type may be a type of information associated with first viewed information of a user with a first viewed amount not less than a first threshold and determined according to a first behavior record of the user. In the first time period, the terminal device may receive the first recommendation information recommended by the server.

At block 302, at a target time point, the terminal device may display a random-recommendation button on a display interface. The target time point may be located within the first time period, and a time interval between the target time point and an ending time point of the first time period may be less than a third threshold.

At block 303, in a target duration for displaying the random-recommendation button, in response to detecting a clicking operation on the random-recommendation button, the terminal device may send a random-recommendation request to the server. The random-recommendation request may be configured to instruct the server to randomly recommend random-recommendation information to the terminal device in the second time period.

At block 304, the server may receive the random-recommendation request from the terminal device. In a second time period, the server may randomly recommend the random-recommendation information to the terminal device, and the terminal device may receive the random-recommendation information randomly recommended by the server.

At block 305, in the second time period, the server may record a second behavior record of the user.

At block 306, in response to the server receiving no random-recommendation request transmitted by the terminal device, the server may recommend fourth recommendation information to the terminal device in the second time period. The fourth recommendation information may be information associated with a third type. The third type may be a type of information associated with third viewed information of the user with a third viewed amount not less than a third threshold and determined according to a third behavior record of the user. The third behavior record may be a record of the behavior of the user in the first time period. The fourth recommendation information may be utilized as the target recommendation information of the second recommendation information. In response to detecting no clicking operation for the random-recommendation button in the target duration, the terminal device may receive the fourth recommendation information recommended by the server.

At block 307, in response to detecting no clicking operation on the random-recommendation button in the target duration, the terminal device may hide the random-recommendation button.

At block 308, in a third time period, the server may recommend third recommendation information to the terminal device. The third recommendation information may be information associated with a second type, and the second type may be a type of information associated with second viewed information of the user with a second viewed amount not less than a second threshold and determined according to a second behavior record of the user. In the third time period, the terminal device may receive the third recommendation information recommended by the server.

It should be noted that, a specific implementation process of each block of the method shown in FIG. 3 may refer to the specific implementation process described in the foregoing method, and details may be not described herein again.

The methods described in some embodiments of the present disclosure have been described in detail above, and a device according to some embodiments of the present disclosure may be disclosed as follow.

Figure 4:
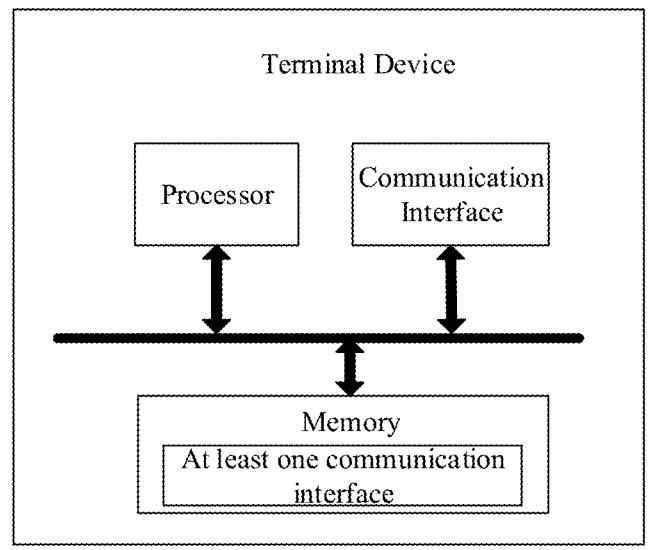
FIG. 4 is a schematic structural view of a terminal device according to some embodiments of the present disclosure.

FIG. 4 is a schematic structural view of a terminal device 400 according to some embodiments of the present disclosure. As shown in FIG. 4, the terminal device 400 may include: at least one processor, at least one memory, at least one communication interface, and at least one program. In some embodiments, the at least one memory may be a non-transitory memory.

The at least one program may be stored in the memory and configured to be executed by the at least one processor. The program may include instructions for performing the method including the following operations.

In a first time period, the terminal device may receive first recommendation information recommended by a server. The first recommendation information may be information associated with a first type, and the first type may be a type of information associated with first viewed information of a user with a first viewed amount not less than a first threshold and determined according to a first behavior record of the user.

In a second time period, the terminal device may receive second recommendation information recommended by the server. In some embodiments, the second recommendation information may include random-recommendation information randomly recommended by the server or target recommendation information recommended by the server.

In a third time period, the terminal device may receive third recommendation information recommended by the server. The third recommendation information may be the information associated with a second type, and the second type may be a type of information associated with second viewed information of the user with a second viewed amount not less than a second threshold and determined according to a second behavior record of the user. The second behavior record may be a record of the behavior of the user in the second time period.

According to some embodiments, a duration of the first time period may be greater than a duration of the second time period, and a duration of the third time period may be greater than the duration of the second time period. The second time period may follow or be subsequent to the first time period, and the third time period may follow or be subsequent to the second time period.

According to some embodiments, the terminal device may receive the random-recommendation information randomly recommended by the server.

According to some embodiments, the first time period may be adjacent to the second time period. Before the terminal device receives the second recommendation information recommended by the server in the second time period, the program may further include instructions for performing the following operations.

At a target time point, a random-recommendation button may be displayed on a display interface. The target time point may be located within the first time period, and a time interval between the target time point and an ending time point of the first time period may be less than a third threshold.

In the target duration, in response to detecting a clicking operation on the random-recommendation button, a random-recommendation request may be sent to the server. The random-recommendation request may be configured to instruct the server to randomly recommend the random-recommendation information to the terminal device in the second time period.

According to some embodiments, the program may include instructions for further performing the following operations.

In response to detecting no clicking operation on the random-recommendation button in the target duration, fourth recommendation information recommended by the server may be received in the second time period. The fourth recommendation information may be information associated with a third type. The third type may be a type of information associated with third viewed information of the user with a third viewed amount not less than a third threshold and determined according to a third behavior record of the user. The third behavior record may be the record of the behavior of the user in the first time period. The fourth recommendation information may be utilized as the target recommendation information of the second recommendation information.

According to some embodiments, the program may include instructions for further performing the following operations.

In response to detecting no clicking operation for the random-recommendation button in the target duration, the random-recommendation button may be hidden.

It should be noted that, a specific implementation manner of the content described in some embodiments may refer to those in the foregoing methods, and details may be not described herein again.

The methods described in some embodiments of the present disclosure have been described in detail above, and a device according to some embodiments of the present disclosure may be disclosed below.

Figure 5:
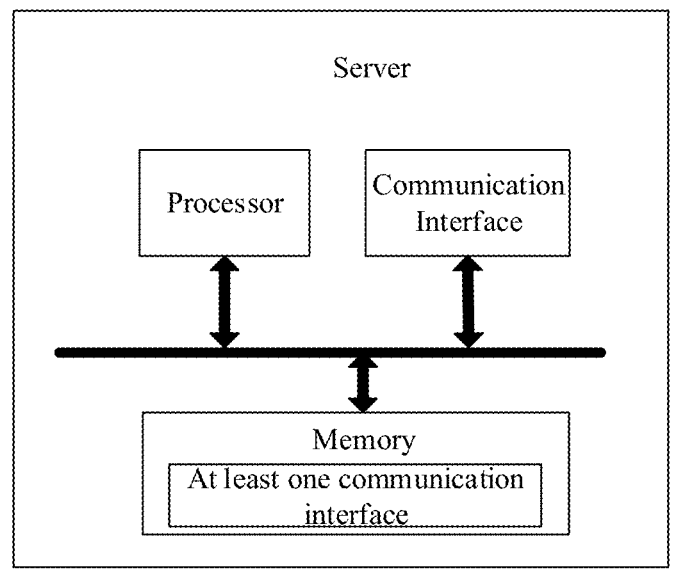
FIG. 5 is a schematic structural view of a server according to some embodiments of the present disclosure.

FIG. 5 shows a server 500 provided in some embodiments of the present embodiment. As shown in FIG. 5, the server

500 may include: at least one processor, at least one memory, at least one communication interface, and at least one program. In some embodiments, the at least one memory may be a non-transitory memory.

The at least one program may be stored in the memory and configured to be executed by the at least one processor. The program may include instructions for performing the method including the following operations.

In a first time period, the server may recommend first recommendation information to a terminal device. The first recommendation information may be information associated with a first type, and the first type may be a type of information associated with first viewed information of a user with a first viewed amount not less than a first threshold and determined according to a first behavior record of the user.

In a second time period, the server may recommend second recommendation information to the terminal device, and record a second behavior record of the user. In some embodiments, the second recommendation information may include random-recommendation information randomly recommended by the server or target recommendation information recommended by the server.

In a third time period, the server may recommend third recommendation information to the terminal device. The third recommendation information may be the information associated with a second type, and the second type may be a type of information associated with second viewed information of the user with a second viewed amount not less than a second threshold and determined according to the second behavior record of the user.

According to some embodiments, a duration of the first time period may be greater than a duration of the second time period, and a duration of the third time period may be greater than the duration of the second time period. The second time period may follow or be subsequent to the first time period, and the third time period may follow or be subsequent to the second time period.

According to some embodiments, the server may randomly recommend the random-recommendation information to the terminal device.

According to some embodiments, before the server recommend the second recommendation information to the terminal device in the second time period, the program may include instructions for further performing the following operations.

A random-recommendation request sent by the terminal device may be received. The random-recommendation request may be configured to instruct the server to randomly recommend the random-recommendation information to the terminal device in the second time period. The random-recommendation request may be triggered in response to the terminal device detecting the clicking operation on the random-recommendation button displayed on a display interface.

According to some embodiments, the program may include instructions for further performing the following operations.

In response to the server receiving no random-recommendation request from the terminal device, the server may recommend fourth recommendation information to the terminal device in the second time period. The fourth recommendation information may be information associated with a third type. The third type may be a type of information associated with third viewed information of the user with a third viewed amount not less than a third threshold and determined according to a third behavior record of the user. The third behavior record may be a record of the behavior of the user in the first time period. The fourth recommendation information may be utilized as the target recommendation information of the second recommendation information.

It should be noted that, a specific implementation manner of the content described in some embodiments may refer to those in the foregoing methods, and details may be not described herein again.

The above describes the technical solution of some embodiments of the present disclosure from the perspective of the method-side execution process. It can be understood that, in order to implement the foregoing functions, the terminal device may include a hardware structure and/or a software module for performing each corresponding function. Those skilled in the art may easily aware that the various example units and algorithm steps described in connection with the embodiments disclosed herein can be implemented as hardware, or a combination of hardware and computer software. Whether such functionality is implemented as hardware or software depends upon the particular application of the technical solution and design constraints. Skilled artisans may implement the described functionality in varying ways for each particular application, but such implementation decisions should not be interpreted as causing a departure from the scope of the present information.

In some embodiments of the present disclosure, the functional units of the terminal device may be divided according to the foregoing method examples. For example, each functional unit may be divided corresponding to each function, or two or more functions may be integrated into one processing unit. The above integrated unit may be implemented in the form of hardware or in the form of software functional unit. It should be noted that, the division of the units in the embodiments of the present disclosure may be schematic, and may be only a logical division. There may be other division manners in actual implementation.

Figure 6:
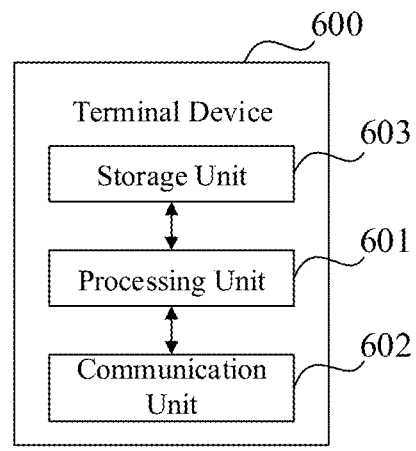
FIG. 6 is a schematic structural view of a terminal device according to some embodiments of the present disclosure.

In case of utilizing an integrated unit, FIG. 6 is a block diagram showing a possible composition of functional units of the terminal device involved in the foregoing embodiments. The terminal device 600 may include a processing unit 601, a communication unit 602, and a storage unit 603. The processing unit 601 may be configured to control and manage actions of the terminal device. The storage unit 603 may be configured to store program codes and data of the terminal device. The communication unit 602 may be configured to support communication between the terminal device and other devices. The processing unit 601 may be configured to execute related operations of the foregoing methods.

In some embodiments, the processing unit 601 may be configured to receive the first recommendation information recommended by the server in the first time period via the communication unit 602. The first recommendation information may be information associated with a first type, and the first type may be a type of information associated with first viewed information of a user with a first viewed amount not less than a first threshold and determined according to a first behavior record of the user. In the second time period, the processing unit 601 may be configured to receive second recommendation information recommended by the server via the communication unit 602. In some embodiments, the second recommendation information may include random-recommendation information randomly recommended by the server or target recommendation information recommended by the server. In the third time period, the processing unit 601 may be configured to receive third recommendation information recommended by the server via the communication unit 602. The third recommendation information may be the information associated with a second type, and the second type may be a type of information associated with second viewed information of the user with a second viewed amount not less than a second threshold and determined according to the second behavior record of the user. The second behavior record may be a record of the behavior of the user in the second time period.

According to some embodiments, a duration of the first time period may be greater than a duration of the second time period, and a duration of the third time period may be greater than the duration of the second time period. The second time period may follow or be subsequent to the first time period, and the third time period may follow or be subsequent to the second time period.

According to some embodiments, the processing unit 601 may be configured to receive the random-recommendation information randomly recommended by the server in the second time period via the communication unit 602.

According to some embodiments, the first time period may be adjacent to the second time period. Before the terminal device receives the second recommendation information recommended by the server in the second time period, the processing unit 601 may be further configured to perform the following functions.

The processing unit 601 may be further configured to display a random-recommendation button on a display interface at a target time point. The target time point may be located within the first time period, and a time interval between the target time point and an ending time point of the first time period may be less than a third threshold. In the target duration, in response to detecting a clicking operation on the random-recommendation button, a random-recommendation request may be sent to the server via the communication unit 602. The random-recommendation request may be configured to instruct the server to randomly recommend the random-recommendation information to the terminal device in the second time period.

According to some embodiments, the processing unit 601 may be further configured to receive fourth recommendation information recommended by the server in the second time period via the communication unit 602, in response to detecting no clicking operation on the random-recommendation button in the target duration. The fourth recommendation information may be information associated with a third type. The third type may be a type of information associated with third viewed information of the user with a third viewed amount not less than a third threshold and determined according to a third behavior record of the user. The third behavior record may be a record of the behavior of the user in the first time period. The fourth recommendation information may be utilized as the target recommendation information of the second recommendation information.

According to some embodiments, the processing unit 601 may be further configured to hide the random-recommendation button in response to detecting no clicking operation on the random-recommendation button in the target duration.

The processing unit 601 may be a processor or a controller (for example, the processing unit may be a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. It may implement or carry out various illustrative logical blocks, modules, and circuits described in connection with the present disclosure. The processor may also be a combination for performing computing functions, for example, a combination including one or more microprocessors, a combination of the DSP and a microprocessor, and the like). The storage unit 603 may be a memory. The communication unit 602 may be a transceiver, a transceiver circuit, a radio frequency chip, a communication interface, and the like.

Figure 7:
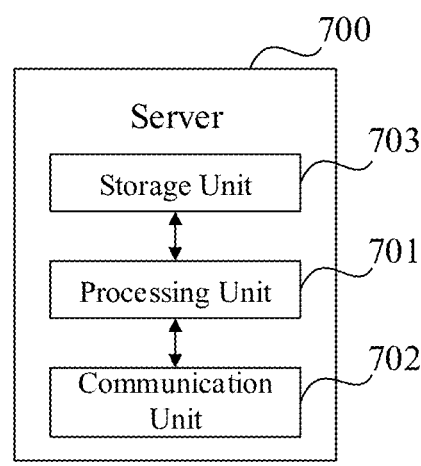
FIG. 7 is a schematic structural view of a server according to some embodiments of the present disclosure.

In case of utilizing an integrated unit, FIG. 7 is a block diagram showing a possible composition of functional units of the server involved in the foregoing embodiments. The server 700 may include a processing unit 701, a communication unit 702, and a storage unit 703. The processing unit 701 may be configured to control and manage actions of the server. The storage unit 703 may be configured to store program codes and data of the server. The communication unit 702 may be configured to support communication between the server and other devices. The processing unit 701 may be configured to execute related operations of the foregoing methods.

The processing unit 701 may be configured to recommend the first recommendation information to the terminal device in a first time period via the communication unit 702. The first recommendation information may be information associated with a first type, and the first type may be a type of information associated with first viewed information of a user with a first viewed amount not less than a first threshold and determined according to a first behavior record of the user. The processing unit 701 may be further configured to recommend the second recommendation information to the terminal device in the second time period via the communication unit 702, and record the second behavior record of the user in the second time period. In some embodiments, the second recommendation information may include random-recommendation information randomly recommended by the server or target recommendation information recommended by the server. The processing unit 701 may be further configured to recommend the third recommendation information to the terminal device in the third time period via the communication unit 702. The third recommendation information may be the information associated with a second type, and the second type may be a type of information associated with second viewed information of the user with a second viewed amount not less than a second threshold and determined according to the second behavior record of the user.

According to some embodiments, a duration of the first time period may be greater than a duration of the second time period, and a duration of the third time period may be greater than the duration of the second time period. The second time period may follow or be subsequent to the first time period, and the third time period may follow or be subsequent to the second time period.

According to some embodiments, the processing unit 701 may be configured to randomly recommend the random-recommendation information to the terminal device in the second time period via the communication unit 702.

According to some embodiments, before the server recommend the second recommendation information to the terminal device in the second time period, the processing unit 701 may be further configured to perform the following functions.

The processing unit 701 may be further configured to receive, via the communication unit 702, a random-recommendation request sent by the terminal device. The random-recommendation request may be configured to instruct the server to randomly recommend the random-recommendation information to the terminal device in the second time period. The random-recommendation request may be triggered in response to the terminal device detecting the clicking operation on the random-recommendation button displayed on the display interface.

According to some embodiments, the processing unit 701 may be further configured to recommend fourth recommendation information to the terminal device in the second time period via the communication unit 702 in response to the server receiving no random-recommendation request from the terminal device. The fourth recommendation information may be information associated with a third type. The third type may be a type of information associated with third viewed information of the user with a third viewed amount not less than a third threshold and determined according to a third behavior record of the user. The third behavior record may be a record of the behavior of the user in the first time period. The fourth recommendation information may be utilized as the target recommendation information of the second recommendation information.

The processing unit 701 may be a processor or a controller (for example, the processing unit may be a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. It may implement or carry out various illustrative logical blocks, modules, and circuits described in connection with the present disclosure. The processor may also be a combination for performing computing functions, for example, a combination including one or more microprocessors, a combination of the DSP and a microprocessor, and the like). The storage unit 703 may be a memory. The communication unit 702 may be a transceiver, a transceiver circuit, a radio frequency chip, a communication interface, and the like.

Figure 8:
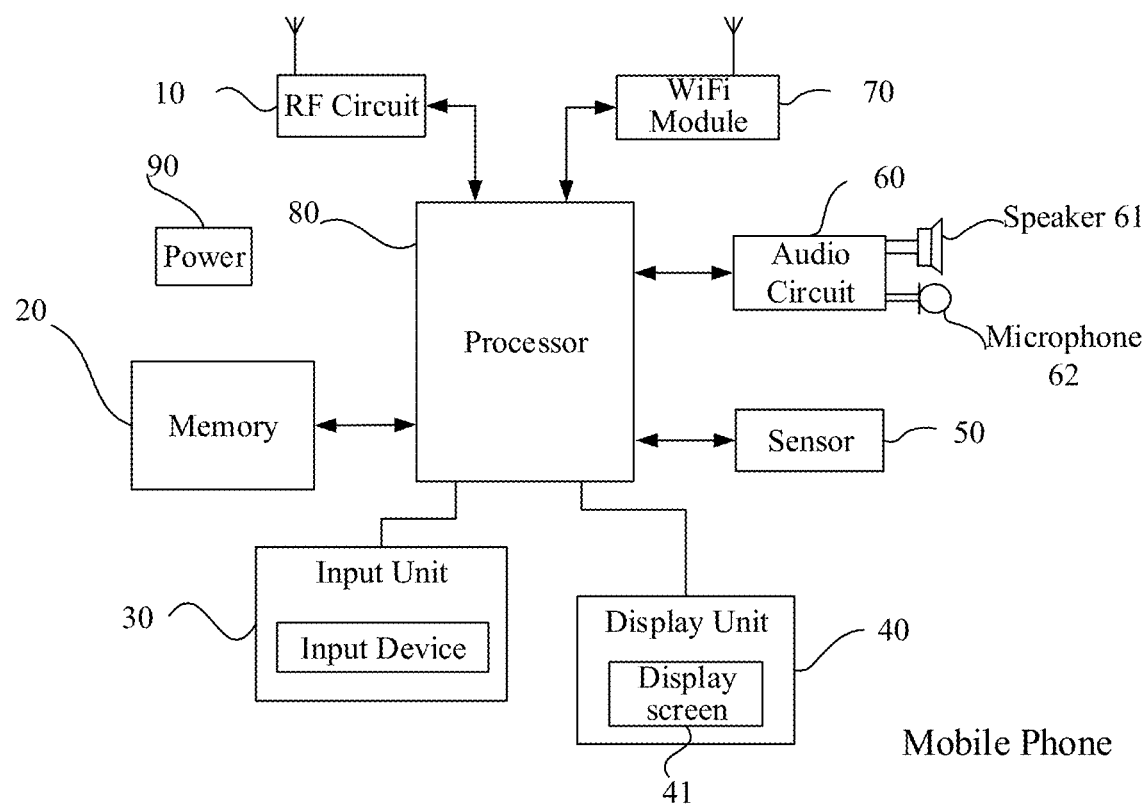
FIG. 8 is a schematic structural view of a terminal device according to some embodiments of the present disclosure.

According to some embodiments of the present disclosure, a terminal device may also be provided. As shown in FIG. 8, for convenience of explanation, only the parts related to the embodiments of the present disclosure may be shown. Specific technical details that have not been disclosed may refer to the methods of the embodiments of the present disclosure. The terminal device may take a mobile phone as an example.

FIG. 8 is a block diagram showing a partial structure of a mobile phone related to a terminal device according to some embodiments of the present disclosure. As shown in FIG. 8, the mobile phone may include: a radio frequency (RF) circuit 10, a memory 20, an input unit 30, a display unit 40, a sensor 50, an audio circuit 60, a wireless fidelity (WiFi) module 70, a processor 80, a power supply 90, and the like. Those skilled in the art may understand that the structure of the mobile phone shown in FIG. 8 does not constitute a limitation to the mobile phone, and the mobile phone may include more or fewer components than those shown in the drawings, or some components may be combined, or may have different component arrangements.

The components of the mobile phone will be described in detail with reference to FIG. 8.

The RF circuit 10 may be configured to receive and transmit information. Generally, the RF circuit 10 may include, but be not limited to, an antenna, at least one amplifier, a transceiver, a coupler, a Low Noise Amplifier (LNA), a duplexer, and the like. In addition, the RF circuit 10 may further communicate with other devices via wireless communication and a network. The above wireless communication may utilize any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The memory 20 may be configured to store software programs and modules. The processor 80 may execute various functional applications and data processing of the mobile phone by running the software programs and the modules stored in the memory 20. The memory 20 may include a program-storing area and a data-storing area. The program-storing area may be configured to store an operating system, at least one application program required for the function, and the like. The data-storing area may be configured to store data created according to the use of the mobile phone and the like. In addition, the memory 20 may include a high-speed random access memory, and may also include a non-volatile memory such as at least one magnetic disk storage or a flash memory, or may include other volatile solid-state storage devices.

The input unit 30 may be configured to receive input digital or character information, and generate key signal input associated with user setting and functional control of the mobile phone. More specifically, the input unit 30 may include a fingerprint recognition module and other input devices. The fingerprint recognition module may be configured to collect fingerprint data of the user and inputted to the fingerprint recognition module. Other input devices may include, but be not limited to, one or more of a touch screen, a physical keyboard, a function key (such as a volume control key, a switch key, and the like), a trackball, a mouse, an joystick, and the like.

The display unit 40 may be configured to display information inputted by the user or information provided to the user and various menus of the mobile phone. The display unit 40 may include a display screen 41. In some embodiments, the display screen 41 may be implemented as a liquid crystal display (LCD), an organic light-emitting diode (OLED) display, and the like.

The mobile phone may also include at least one type of sensor 50, such as a light sensor, a motion sensor, and other sensors. More specifically, the light sensor may include an ambient light sensor and a proximity sensor. In some embodiments, the ambient light sensor may be configured to adjust the brightness of the display screen 41 according to the brightness of the ambient light. The proximity sensor may be configured to turn off the display screen 41 and/or backlight when the mobile phone is moved to the ear. As a motion sensor, the accelerometer sensor may detect a magnitude of acceleration in all directions (usually three axes). When it is stationary, the accelerometer sensor may detect the magnitude and the direction of gravity, and may be used to identify an applied gesture of the mobile phone (such as horizontal and vertical screen switching, related games, magnetometer attitude calibration), vibration recognition related functions (such as pedometer, tapping), and the like. Other sensors such as gyroscopes, barometers, hygrometers, thermometers, infrared sensors, and the like, may be configured on the mobile phone. These will no longer be described herein.

An audio circuit 60, a speaker 61, and a microphone 62 may provide an audio interface between the user and the mobile phone. The audio circuit 60 may convert received audio data into an electrical signal and then transmit the electrical signal to the speaker 61. The speaker 61 may then convert the electrical signal into a sound signal for playing. On the other hand, the microphone 62 may convert a captured sound signal into an electrical signal. The audio circuit 60 may receive the electrical signal and then convert the electrical signal into audio data. The process 80 may process the audio data and then transmit the audio data to another mobile phone via the RF circuit 10, or transmit the audio data to the memory 20 for further processing.

Wi-Fi belongs to a short-range wireless transmission technology. The mobile phone may assist the user to receive and send e-mails, browse Webpages, access to streaming media and the like by means of the Wi-Fi module 70. The Wi-Fi may provide a wireless wideband internet access for the user. Although the Wi-Fi module 70 is illustrated in FIG. 8, it may be understood that, the Wi-Fi module 70 may be optional components of the mobile phone and may be totally omitted without changing the essence of the present disclosure as claimed.

The processor 80 may be a control center of the mobile phone. The processor 80 may be connected to all parts of the mobile phone by utilizing various interfaces and lines and execute various functions and processing data of the mobile phone by running or executing the software program and/or the modules stored in the memory 20 and calling data stored in the memory 20. Thus, the mobile phone may be wholly monitored. Optionally, the processor 80 may include one or more processing units. Optionally, the processor 80 may be integrated with an application processor and a modulation-demodulation processor. The application processor may process an operation system, a user interface, an application program, and the like. The modulation-demodulation processor may process wireless communication. It will be appreciated that the above described modulation-demodulation processor may also not be integrated into the processor 80.

The mobile phone may also include the power supply 90 (such as a battery) that supplies power to the various components. Optionally, the power supply may be logically coupled to the processor 80 through a power management system to manage functions such as charging, discharging, and power management by means of the power management system.

Although not shown here, the mobile phone may further include a camera, a Bluetooth module, and the like. These will not be described in detail herein again.

In the foregoing embodiments shown in FIG. 1 and FIG. 3, each action/operation of the method may be implemented based on the structure of the mobile phone.

In the foregoing embodiments shown in FIG. 6, each unit function may be implemented based on the structure of the mobile phone.

A computer storage medium may be further provided in some embodiments of the present disclosure. The computer storage medium may be configured to store a computer program for electronic data exchange. The computer program may cause a computer to perform some or all of the operations of any method described in the foregoing method embodiments. The computer may include a terminal device.

A computer storage medium may be further provided in some embodiments of the present disclosure. The computer storage medium may be configured to store a computer program for electronic data exchange. The computer program may cause a computer to perform some or all of the operations of any method described in the foregoing method embodiments. The computer may include a server.

A computer program product may be further provided in some embodiments of the present disclosure. The computer program product may include a non-transitory computer-readable storage medium storing a computer program. The computer program may be operable to cause a computer to perform some or all of the operations of any method described in the foregoing method embodiments. The computer program product may be a software installation package, and the computer may include the terminal device.

A computer program product may be further provided in some embodiments of the present disclosure. The computer program product may include a non-transitory computer-readable storage medium storing a computer program. The computer program may be operable to cause a computer to perform some or all of the operations of any method described in the foregoing method embodiments. The computer program product may be a software installation package, and the computer may include the server.

The steps of a method or algorithm described in connection with the example embodiments disclosed herein may be embodied in hardware, or in a software instruction executed by a processor. The software instruction may be composed of a corresponding software module. The software module may be stored in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of storage medium known in the art. An example storage medium may be coupled to the processor such that the processor may read information from, and write information to, the storage medium. Certainly, the storage medium may also be integral to the processor. The processor and the storage medium may reside in an ASIC. In addition, the ASIC may be located in an access network device, a target network device, or a core network device. Certainly, the processor and the storage medium may reside as discrete components in the access network device, the target network device, or the core network device.

Those skilled in the art should be aware that, in one or more of the above examples, the functions described in some embodiments of the present disclosure may be implemented completely or partially in software, hardware, firmware, or any combination thereof. When implemented in software, the functions may be completely or partially implemented in the form of a computer program product. The computer program product may include one or more computer instructions. When the computer program instructions is loaded and executed by a computer, the processes or functions according to some embodiments of the present disclosure may be completely or partially generated. The computer may be a general-purpose computer, a special-purpose computer, a computer network, or other programmable devices. The computer instructions may be stored in a computer-readable storage medium, or transmitted from one computer-readable storage medium to another computer-readable storage medium. For example, the computer instructions may be transmitted from a website site, a computer, a server, or a data center to another website site, computer, server or data center by wire (such as a coaxial cable, a fiber optic cable, a Digital Subscriber Line (DSL)) or wirelessly (such as infrared, radio, microwave, microwave, and the like). The computer-readable storage medium may be any available medium that can be accessed by the computer or a data storage device including a server, a data center, and the like that may be integrated by one or more available media. The available medium may be a magnetic medium (such as a floppy disk, a hard disk, a magnetic tape), an optical medium (such as a Digital Video Disc (DVD), a semiconductor medium (such as a solid state disk (SSD)), and the like.

The specific implementation manners described above may further describe the objectives, technical solutions, and beneficial effects of some embodiments of the present disclosure in detail. It should be understood that the foregoing may be only some specific implementation manners of some embodiments of the present disclosure and may be not used to limit the protection scope of some embodiments of the present disclosure. Any modification, equivalent replacement, or improvement made on the basis of the technical solution of some embodiments of the present disclosure shall be included in the protection scope of some embodiments of the present disclosure.

What is claimed is:

1. A method for information recommendation, comprising:
receiving, by a terminal device, first recommendation information recommended by a server in a first time period, the first recommendation information being information associated with a first type, and the first type being a type of information associated with first viewed information of a user with a first viewed amount not less than a first threshold and determined according to a first behavior record of the user;
receiving, by the terminal device, second recommendation information randomly recommended by the server in a second time period; and
receiving, by the terminal device, third recommendation information recommended by the server in a third time period, the third recommendation information being information associated with a second type, and the second type being a type of information associated with second viewed information of the user with a second viewed amount not less than a second threshold and determined according to a second behavior record of the user; and the second behavior record being a record of a behavior of the user recorded by the server in the second time period,
wherein a duration of the first time period is greater than a duration of the second time period, a duration of the third time period is greater than the duration of the second time period, the second time period follows the first time period, and the third time period follows the second time period.

2. The method according to claim 1, wherein the first time period is adjacent to the second time period; and
the method further comprises:
before receiving, by the terminal device, the second recommendation information recommended by the server in the second time period:
displaying, by the terminal device, a random-recommendation button on a display interface at a target time point; wherein the target time point is located within the first time period, and a time interval between the target time point and an ending time point of the first time period is less than a third threshold; and
in response to detecting a clicking operation on the random-recommendation button, sending, by the terminal device, a random-recommendation request to the server in a target duration; wherein the random-recommendation request is configured to instruct the server to randomly recommend the second recommendation information to the terminal device in the second time period.

3. The method according to claim 2, further comprising:
in response to detecting no clicking operation on the random-recommendation button in the target duration, hiding, by the terminal device, the random-recommendation button.

4. A method for information recommendation, comprising:
recommending, by a server, first recommendation information to a terminal device in a first time period, the first recommendation information being information associated with a first type, and the first type being a type of information associated with first viewed information of a user with a first viewed amount not less than a first threshold and determined according to a first behavior record of the user;
randomly recommending, by the server, second recommendation information to the terminal device in a second time period and recording a second behavior record of the user in the second time period; and
recommending, by the server, third recommendation information to the terminal device in a third time period, the third recommendation information being information associated with a second type, and the second type being a type of information associated with second viewed information of the user with a second viewed amount not less than a second threshold and determined according to the second behavior record,
wherein a duration of the first time period is greater than a duration of the second time period, a duration of the third time period is greater than the duration of the second time period, the second time period follows the first time period, and the third time period follows the second time period.

5. The method according to claim 4, wherein the method further comprises:
before randomly recommending, by the server, the second recommendation information to the terminal device in the second time period:
receiving, by the server, a random-recommendation request transmitted by the terminal device, wherein the random-recommendation request is configured to instruct the server to randomly recommend the second recommendation information to the terminal device in the second time period, and the random-recommendation request is triggered in response to the terminal device detecting a clicking operation on a random-recommendation button.

6. A terminal device, comprising at least one processor, at least one non-transitory memory, and at least one program; wherein the at least one program is stored in the at least one non-transitory memory and configured to be executed by the at least one processor to perform an information recommendation method, the method comprises:
receiving, by a terminal device, first recommendation information recommended by a server in a first time period, the first recommendation information being information associated with a first type, and the first type being a type of information associated with first viewed information of a user with a first viewed amount not less than a first threshold and determined according to a first behavior record of the user;
receiving, by the terminal device, second recommendation information randomly recommended by the server in a second time period; and
receiving, by the terminal device, third recommendation information recommended by the server in a third time period, the third recommendation information being information associated with a second type, and the second type being a type of information associated with second viewed information of the user with a second viewed amount not less than a second threshold and determined according to a second behavior record of the user; the second behavior record being a record of a behavior of the user recorded by the server in the second time period, wherein a duration of the first time period is greater than a duration of the second time period, a duration of the third time period is greater than the duration of the second time period, the second time period follows the first time period, and the third time period follows the second time period.

7. The terminal device according to claim 6, wherein the first time period is adjacent to the second time period; and the method further comprises:

before receiving, by the terminal device, the second recommendation information randomly recommended by the server in the second time period:

displaying, by the terminal device, a random-recommendation button on a display interface at a target time point; wherein the target time point is located within the first time period, and a time interval between the target time point and an ending time point of the first time period is less than a third threshold; and in response to detecting a clicking operation on the random-recommendation button, sending, by the terminal device, a random-recommendation request to the server in a target duration; wherein the random-recommendation request is configured to instruct the server to randomly recommend the second recommendation information to the terminal device in the second time period.

8. The terminal device according to claim 7, wherein the terminal device is configured to hide the random-recommendation button in response to detecting no clicking operation on the random-recommendation button in the target duration.

9. A server, comprising at least one processor, at least one non-transitory memory, and at least one program; wherein the at least one program is stored in the at least one non-transitory memory and configured to be executed by the at least one processor to perform an information recommendation method, the method comprises:

recommending, by a server, first recommendation information to a terminal device in a first time period, the first recommendation information being information associated with a first type, and the first type being a type of information associated with first viewed information of a user with a first viewed amount not less than a first threshold and determined according to a first behavior record of the user;

randomly recommending, by the server, second recommendation information to the terminal device in a second time period and recording a second behavior record of the user in the second time period; and recommending, by the server, third recommendation information to the terminal device in a third time period, the third recommendation information being information associated with a second type, and the second type being a type of information associated with second viewed information of the user with a second viewed amount not less than a second threshold and determined according to the second behavior record, wherein a duration of the first time period is greater than a duration of the second time period, a duration of the third time period is greater than the duration of the second time period, the second time period follows the first time period, and the third time period follows the second time period.

10. The server according to claim 9, wherein the method further comprises:

before randomly recommending, by the server, the second recommendation information to the terminal device in the second time period:

receiving, by the server, a random-recommendation request transmitted by the terminal device, wherein the random-recommendation request is configured to instruct the server to randomly recommend the second recommendation information to the terminal device in the second time period, and the random-recommendation request is triggered in response to the terminal device detecting a clicking operation on a random-recommendation button.

* * * * *